United States Patent Office 3,415,350
Patented Dec. 10, 1968

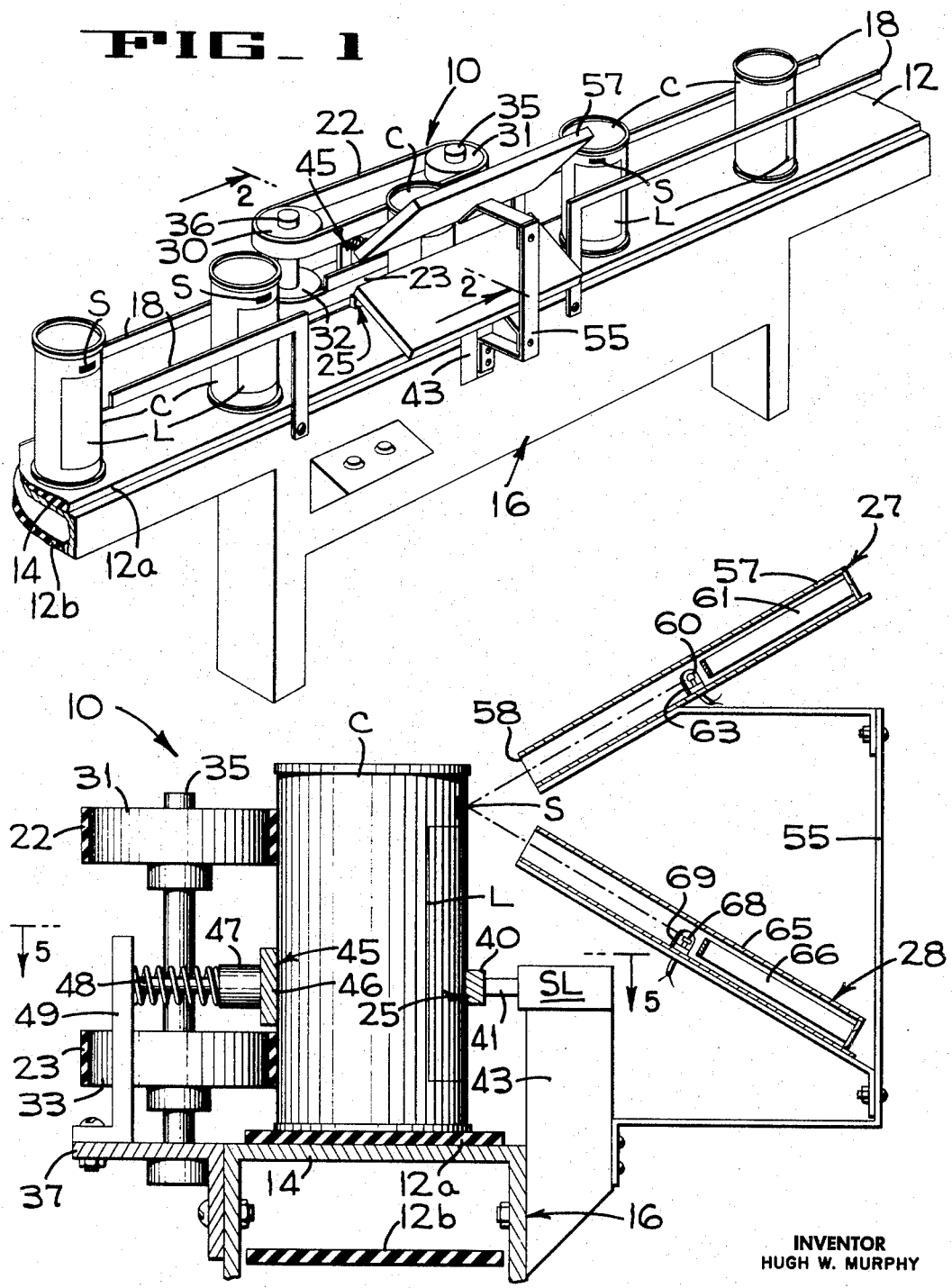

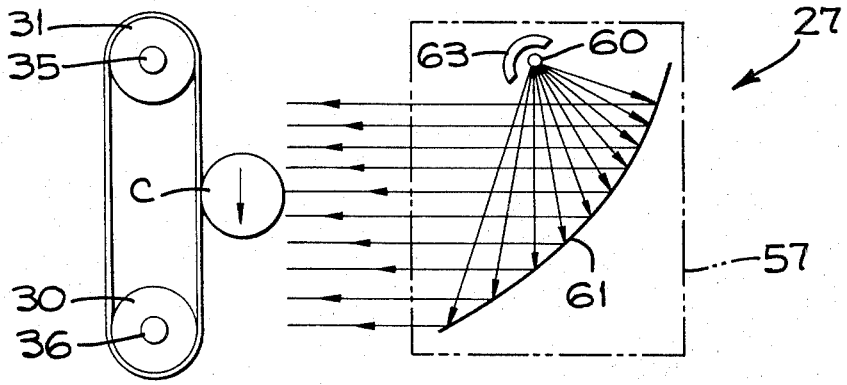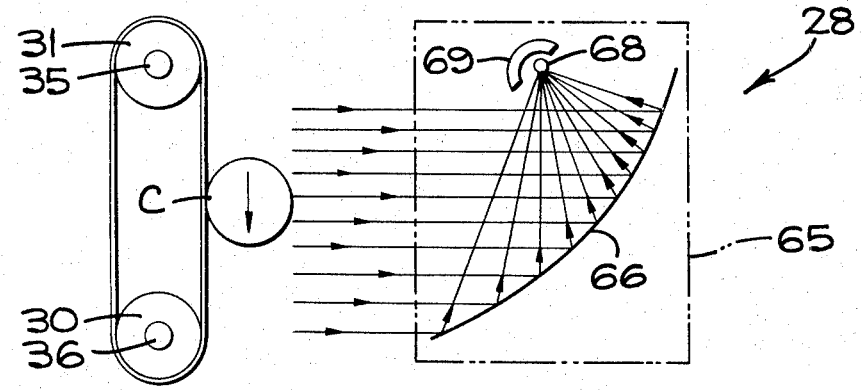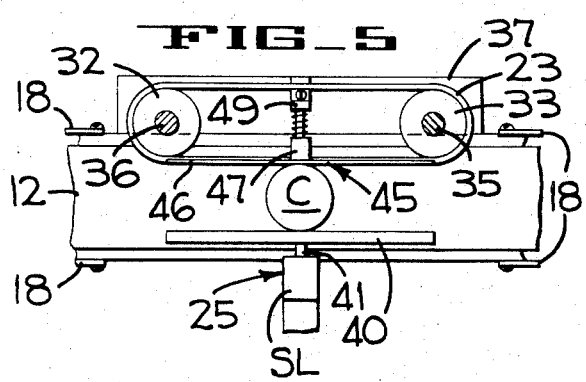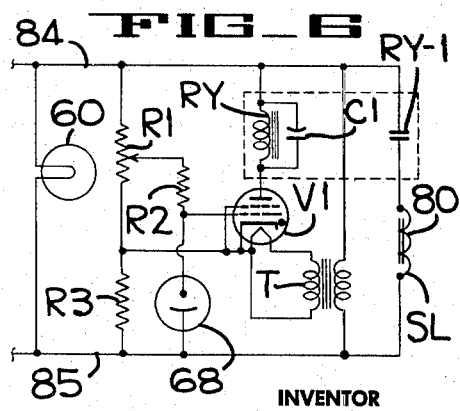

3,415,350
ARTICLE ORIENTING APPARATUS
Hugh W. Murphy, Saratoga, Calif., assignor to FMC Corporation, San Jose, Calif., a corporation of Delaware
Filed Oct. 24, 1966, Ser. No. 588,953
11 Claims. (Cl. 198—33)

ABSTRACT OF THE DISCLOSURE

An endless belt conveyor transports a series of spaced cans in upright positions past a photoelectric detective device. A driving belt and pusher bar are caused to successively engage each can on opposite sides thereof adjacent to the detecting means to rotate it about its vertical axis without disturbing its spacial position on the conveyor belt until the detecting device senses a specially marked area upon the surface of the can. At that time control means are actuated to remove the driving belt and pusher bar to leave the can in a predetermined rotated orientation.

---

The present invention pertains to article orienting apparatus and more particularly to a device for orienting a series of cylindrical containers in a processing line into identical rotated positions just prior to their final packaging.

During recent years packaging methods for canned beverages have undergone some revolutionary changes. For example, the familiar cylindrical cans containing beverages such as beer are now frequently packaged in six-pack carriers wherein a flat plastic member is utilized which grips the containers only at their tops. The advent of high strength, low cost plastics has resulted in other changed packaging methods wherein the container itself is now prominently displayed to the purchaser. With these changes, it has become important from a sales standpoint that the packaged product be made as eye-catching and appealing to the consumer as possible. Consequently, in those packaging methods wherein the containers are exposed it has been found necessary to provide means for orienting the containers into particular rotated positions just prior to their final packaging so that all of the labels on the containers will face in the same direction, thus giving a pleasing appearance to the package as it is seen by the consumer.

While the problem of providing for a preferred rotational orientation of containers handled by a processing system has long been known to those in the industry, a commercially successful apparatus for accomplishing such a function has not yet been introduced. Many of the prior art devices which accomplish this type of orientation of individual containers do so at a prohibitive cost and include complicated mechanisms subject to malfunction or breakdown. In most instances, it has been found to be more economical to have the containers rotated by hand either during or before the final packaging rather than to resort to the use of an additional mechanism for this purpose which might prove costly, restrict the speed of the operation, and which might well prove to be just another piece of equipment subject to breakdown and resulting stoppage of the over-all processing system.

It is an object of the present invention to provide a device for orienting cylindrical containers by rotating them about their longitudinal axes and into predetermined angular positions which device is both economical to produce and capable of functioning in a highly efficient and rapid manner.

Another object of the present invention is to provide a device for individually rotating cylindrical containers within a spaced series of such containers while maintaining the correct spacing between each of the containers.

Another object of the present invention is to provide a device of the character described which will operate upon ordinary cylindrical containers having no special protuberances or projections thereon.

Other objects and advantages of the present invention will become apparent from the following description and the accompanying drawings, in which:

FIGURE 1 is a perspective of the apparatus of the present invention as utilized with a container processing system that includes a flat belt conveyor for transporting a series of spaced containers.

FIGURE 2 is an enlarged transverse section taken substantially on line 2—2 of FIGURE 1.

FIGURE 3 is a diagrammatic plan illustrating the function of the light source.

FIGURE 4 is a diagrammatic plan, similar to FIGURE 3, illustrating the function of the light receiving means.

FIGURE 5 is a reduced horizontal section taken along the line 5—5 of FIGURE 2.

FIGURE 6 is a diagram of the electrical control system for the apparatus shown in FIGURE 1.

Referring now more particularly to the drawings, FIGURE 1 shows an embodiment of the apparatus 10 of the present invention which is designed to operate in conjunction with a container processing or handling system which includes a flat belt conveyor 12 carrying a series of spaced containers C, only a portion of the conveyor belt being shown in FIGURE 1. Conveyor belt 12 is an endless belt of the conventional variety and has an upper reach 12a designed to ride over the flat upper surface 14 of a supporting structure 16 and a lower reach 12b extending beneath the surface 14. The belt is adapted to be continuously driven by power means (not shown) such as an electric motor or the like. Extending from the upper edge of the supporting structure 16 are a series of railings 18 between which the cylindrical containers C are conveyed.

The object of the orienting apparatus 10 of the present invention is to rotate the containers C individually about their vertical major axes until the containers are positioned in similar angular orientations. For example, in the system shown in FIGURE 1, the cans on the downstream side of the orienting apparatus, i.e., to the left of apparatus, all have been rotated into angular positions whereby the labels L face outwardly toward the front portion of the supporting structure 16 transverse to the direction of movement of the conveying belt 12. The cans C on the upstream side or entry side of the orienting apparatus, while spaced apart in the same manner as those cans downstream of the apparatus, are randomly oriented and the labels on these cans may face in any direction. Since the labels on the cans, as shown, occupy only one position upon the total circumference of the can, the appartus of the present invention must be capable of rotating each can through a complete 360° in order to assure that all of the labels will face the same direction upon emergence from the apparatus regardless of the original randomly oriented position of the label. In some instances, where there is a similar label on both sides of the can, each can may only have to be rotated through a maximum of 180° in order to assure that all labels will be oriented alike. Such a distinction will determine the effective length of the apparatus required.

The orienting apparatus 10 of the present invention generally comprises means for rotating the containers C including spaced, friction belts 22 and 23, a solenoid-operated plunger 25 urging the containers against the drive belts, and a control system for operating the apparatus including a light source 27 and a light receiving means 28.

The endless friction belts 22 and 23 are trained about an upper set of horizontal rollers 30 and 31 and a lower set of horizontal rollers 32 and 33, respectively. The rearward rollers 31 and 33 are rotatably mounted upon a shaft 35 which is rigidly mounted on an angle bracket 37 attached to a rearward portion of the supporting structure 16, the rollers 31 and 33 serving as idler rollers for the friction belts. The forward rollers 30 and 32 are fixed to a vertical shaft 36 which extends through the bracket 37 and is adapted to be continuously driven during operation of the apparatus 10 by suitable power means (not shown) such as an electric motor or the like. The shaft 36 is arranged to be rotated at a constant speed such that the belts 22 and 23 will move at a linear speed exactly double that of the linear speed of the main conveyor belt 12.

During the operation of the apparatus, a can C will be rotated about its vertical longitudinal axis when the plunger 25 is moved so as to push the can into engagement with the friction belts 22 and 23. The plunger includes an elongate, flat-faced pusher member 40 which extends parallel to the friction belts and is of a length approximately equal to the distance between the shafts 35 and 36 about which the belts are trained, as best seen in FIGURE 5. The pusher member 40 is supported by a laterally movable rod 41 under the control of a solenoid SL which is mounted upon an upright supporting member 43 that is attached to the front portion of the supporting structure 16.

The cans C are arranged to be moved away from the friction belts 22 and 23 when they reach the desired orientation by means of a second, spring-actuated plunger 45 which is caused to automatically operate when the plunger 25 is retracted by the solenoid SL. The plunger 45 includes a flat pusher element 46 similar to and extending parallel to and for the same distance as the pusher member 40. Pusher 46 includes a rearwardly extending boss 47 that is slidable upon a rod 48 rigidly attached to an upstanding bracket 49 that is affixed to the upper surface of the supporting bracket 37. A compression spring is provided between the boss 47 and the bracket 49 in encircling relation to the rod 48 so as to put a mild degree of force upon the flat-faced pusher member 46 sufficient to move a can away from the friction belts. The total amount of permissible relative movement between the boss 47 and the rod 48 is limited to a very short distance so that the cans will be subjected to only a very slight movement away from the belts. The function of the spring-actuated plunger 45 is to prevent the cans from being subjected to a whipping action by the belts 22 and 23 when the plunger 25 is retracted so that they will be left in the correct oriented position which they have just obtained.

The operation of the plunger 25 which causes the cans C to be rotated is determined by the control means 27 and 28 which are mounted, on the opposite side of the conveyor 12 from the friction belts 22 and 23, by means of a mounting bracket 55 attached to the supporting member 43. The upper control means or light source 27 comprises a flat rectangular box 57 which is open at its front end 58. The box is angled downwardly towards the upper end of the can. Housed within the box structure are an incandescent lamp 60 and a parabolic reflector 61. As shown in the diagrammatic illustration of FIGURE 3, the lamp is stationed at the upstream side of the box and includes a light shield 63 so that all of the available light will be concentrated on the reflector 61 which is positioned so that the light waves will thereby be directed perpendicularly to the direction of travel of the can upon the conveyor, as indicated by the arrows.

FIGURE 4 shows diagrammatically the arrangement of the lower control or light receiving means 28 which comprises a flat rectangular box 65 housing a parabolic reflector 66, these items being identical with the box 57 and reflector 61. Arranged at the upstream edge of the box 65 is a photoelectric tube 68 positioned at the focal point of the parabolic reflector so that all light rays, that are reflected perpendicularly from the path of travel of the cans C and strike the reflector, will converge at the location of the cell. A light shield 69 is provided to prevent spurious reflections or other stray light from affecting the cell. As seen in FIGURE 2, the box 65 is also mounted upon bracket 55 directly below the light source box 57 and is angled upwardly with its open end facing the containers so that it forms an angle with the horizontal exactly equal to the angle formed by the box 57 with the horizontal.

During operation of the apparatus of the present invention, light from the incandescent lamp 60 is reflected from the surface of the cans and detected by the photoelectric cell 68. As shown in FIGURE 2, the projection of the light source 27 and the projection of the light receiving means 28 converge at a point on the surface of a container near its upper edge. A specially darkened area S is printed or otherwise marked upon the containers at this position, with such darkened area being centrally located with respect to the labels L on each container. In the embodiment of the invention described the area S reflects less light than the remainder of the container at the same elevation. Therefore, a decrease in the amount of light detected by the photoelectric cell 69 will indicate that the area S and the can label are facing directly towards the parallel light rays of the light source 27. This position is the preferred rotational orientation of the containers as they are conveyed along the belt 12, and subsequent packaging machinery will maintain this orientation to achieve a uniform and pleasing display of the packaged containers.

While the presently described embodiment of the invention depends upon the detection of an area darker than the remainder of the container, the reverse of this method of operation is also possible. That is to say, a small area on the container may be made highly reflective compared to the remainder of the container so that it will reflect a detectably greater amount of light to the photoelectric cell.

The type of marking upon the can may be of any variety so long as the surface of the container at the distinctively marked area reflects a detectably different amount of light than the remainder of the can at the same elevation. The label itself may therefore be used as the marker if there is a centrally located, particularly marked area at a given elevation. The control means 27 and 28 may be adjusted upon the mounting bracket 55 (by conventional means, not shown) so that the elevation at which the light impinges upon the surface of the container may be varied to permit the apparatus to be useful with any container label meeting the above requirements.

Although not shown, darkened light-absorbing shielding may be placed about the orienting apparatus 10 so that unwanted reflections and stray light from sources other than lamp 60 will not affect the desired controlled operation of the photoelectric cell.

During operation of the apparatus of the present invention the containers C will be conveyed along the belt 12 in random rotational orientation. The containers are spaced apart a distance at least equal to the length of the pusher member 40, this distance also corresponding to the usable width of the parabolic reflectors 61 and 66. When there is no container within the range of the light source 27, no light will be reflected and detected by the photocell 68 and the plunger 25 will be retracted within the solenoid structure. When a container moves within the range of the light source its upper surface will reflect the light from the lamp to the photocell and thereby cause the plunger 25 to be pushed forward so that the forward face of the pusher 40 abuts the container and urges it against the continuously driven friction belts 22 and 23 and the spring-urged pusher member 46. While under this condition the container will be rotated by the belts about its vertical axis and will roll along the face of the pusher member 40. Since the friction belts are arranged to travel at a linear rate exactly double that of the supporting conveyor belt 12, the container being rotated will not be shifted in position with respect to the containers upstream and downstream from it. When the darkened area S is rotated into a position in alignment with the light rays from the lamp 60, there will be a detectable decrease in the amount of light reflected to the photocell, and appropriate circuitry (to be described) will operate to retract the plunger 25. Simultaneously with the retraction of the pusher 40, the spring-actuated plunger 45 acts to push the container free from the belts 22 and 23 so that it will not be further rotated. The limited movement of the plunger 45 is just enough to free the container from the drive belts without disturbing its rotational orientation upon the conveyor belt 12. After a container has become correctly oriented, the photocell will continue to detect the decreased light reflected by the dark area S on the container, and the plunger 25 will remain retracted until that container is moved out of the range of the light source 27 and a new container has been moved into range.

The circuitry for operating the plunger 25 may be of any conventional design and its specific arrangement does not form a part of the present invention. A circuit which may be used is shown schematically in FIGURE 6. The solenoid SL, which is provided to retract the plunger 25 when the apparatus is in operation, is energized through conventional A.C. lines 84 and 85 when a relay contact RY–1 is closed. The incandescent lamp 60 is connected directly across lines 84 and 85, and the photoelectric tube 68 is connected to the grid of a gas-filled thyratron tube V1 so as to control the firing thereof. When the photoelectric tube receives the light reflected from the surface of a container, it will generate a high enough voltage on the grid of the thyratron to cause the firing of the tube during the positive half cycles of the alternating voltage source. On the negative half cycles, the current through the solenoid SL and biasing resistance R3 will be extinguished. Resistance R2 and adjustable resistor R1 are used to set the firing level of the thyraton and to keep the peak voltage across the tube within the maximum rating. A relay RY is connected to the plate of the thyraton so that during conduction the contact RY–1 will be closed to allow current to pass through the solenoid coil 80 to extend the plunger 25. A capacitor C1 is placed in parallel with the relay RY to keep the relay closed and prevent chatter during the negative half cycles of the current conducting periods. Transformer T is used as a heater transformer for the cathode of the thyratron.

When the proper orientation of the conveyor is achieved and the darkened area S has been rotated into the proper position so as to cut down the reflected light to the photocell 68, the voltage across the cell will drop below that sufficient to initiate firing of the thyratron and conduction by the thyratron will be extinguished. The consequent opening of the contact RY–1 and de-energization of the solenoid 80 will allow the plunger 25 to be retracted.

From the foreging description it will be seen that the orienting apparatus 10 of the present invention provides a means whereby a continuous series of containers may be rotated into similar positions in a very rapid and relatively non-complicated manner. The apparatus is constructed so that the relative position of the container upon the conveyor belt 12 will not change even though its rotated or angular position is altered. The apparatus is designed for relatively high speed operation and can readily handle the container lines in commercial packaging operations.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for orienting containers comprising conveying means for continuously moving a series of said containers along a predetermined path, friction gripping means directly engageable with said containers for rotating each container about its axis, stationarily mounted means positioned adjacent to said path for detecting a distinctively marked area on each of said containers as said containers are carried by said conveying means, and means operative in response to said detecting means to selectively disengage said means for rotating the containers after the containers have been rotated by varying angular amounts whereby each of said containers may be placed in a predetermined orientation with said marked areas of said containers all occupying similar positions with respect to said conveying means.

2. Apparatus for orienting containers as set forth in claim 1 wherein said means for detecting a distinctively marked area on each of said containers comprises a photoelectric control unit positioned so as to receive light reflected from the surfaces of said containers.

3. Apparatus for orienting containers as set forth in claim 1 wherein said means for rotating each container about its axis comprises a driven belt positioned adjacent to and parallel to said conveying means and pusher means for moving said containers laterally of said conveying means and into engagement with said belt without removing said containers from the conveying means.

4. Apparatus for orienting a series of cylindrical containers comprising conveying means for continuously transporting said containers along a predetermined path in spaced relationship, means directly engageable with said containers for causing rotation of said containers about their axes by varying angular amounts as they are moved by said conveying means, a light source stationarily mounted adjacent to said conveying means so as to strike a container along a particular segment thereof as it is transported along said path, a photoelectric cell, means for receiving light reflected from said segment of said container perpendicularly to said conveying means and for directing said received light to said photoelectric cell, said container segment including at least one marked area reflecting a distinctively different amount of light than the remainder thereof, and means controlled by said photoelectric cell for controlling the means for causing rotation of said containers so that each of said containers may be rotated through an angular distance sufficient to place it in a final orientation with said marked area facing in a particular desired direction.

5. Apparatus for orienting containers as set forth in claim 4 wherein said means for causing rotation of said containers comprises a friction belt mounted parallel to said conveying means and a flat-faced pusher element for shifting a container laterally of said conveying means and into engagement with said friction belt.

6. Apparatus for orienting containers as set forth in claim 5 wherein said belt is driven at a linear speed twice that of said conveying means and extends for a distance approximately equal to and in alignment with the effective length of said means for receiving light reflected from said segment of said container whereby said containers will be rotated about their axes without altering their relative spacing or upon conveying means.

7. Apparatus for orienting containers as set forth in claim 4 wherein said means for receiving light and directing it to said photoelectric cell comprises a parabolic reflecting surface.

8. Apparatus for orienting a series of cylindrical containers comprising conveying means for transporting said containers in upright and uniformly spaced positions, a friction belt mounted adjacent to and parallel to said conveying means, means for driving said belt at a linear speed twice that of said conveying means, pusher remains for moving a container laterally of said conveying means and into engagement with said belt so that said container may be rotated about its axis, and control means for operating said pusher means so that said container will be released from engagement with said belt when it has achieved a predetermined rotational orientation.

9. Apparatus for orienting a series of cylindrical containers as set forth in claim 8 including means for moving said container laterally away from said friction belt upon release of said container by said pusher means.

10. Apparatus for orienting cylindrical containers as set forth in claim 9 wherein said means for rotating each container about its axis comprises a driven friction member positioned adjacent to said conveying means and a pusher member for urging said containers against said friction member.

11. Apparatus for orienting cylindrical containers comprising an endless conveyor belt for continuously moving a series of spaced containers in upright positions, means engageable with said containers for individually rotating each container about its vertical axis by varying angular amounts while it is moved by said belt and without changing its spatial position with respect to said belt so as to maintain the spacing of said containers, a light source for directing light to a particular horizontal segment of said containers, and photoelectric means for detecting a distinctively marked area on each of said containers within said particular segment illuminated by said light source, said last named means being arranged to control said means for rotating said container whereby all of said containers will be rotated so that the distinctively marked areas thereon will be oriented in a common direction.

References Cited
UNITED STATES PATENTS

| | | | |
|---|---|---|---|
| 1,997,712 | 4/1935 | Bauer | 250—223 X |
| 2,109,505 | 3/1938 | Rue | 198—33 |
| 2,693,872 | 11/1954 | Baader | 198—33 |
| 3,074,531 | 1/1963 | Pechy | 198—33 |

EDWARD A. SROKA, *Primary Examiner.*

U.S. Cl. X.R.

250—223